Feb. 14, 1967  B. E. SHLESINGER, JR  3,304,386
MULTIPLE CONTACT PROGRAM SYSTEM FLUID PRESSURE TYPE
Filed June 25, 1964  3 Sheets-Sheet 1
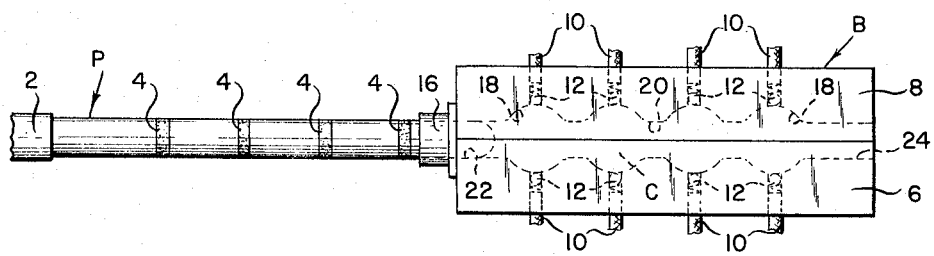
fig.1
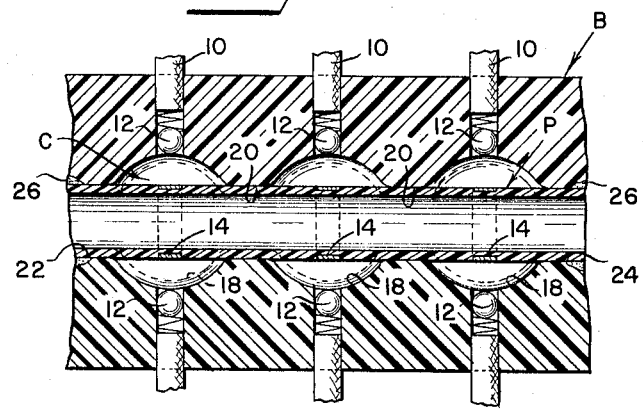
fig.2
fig.3
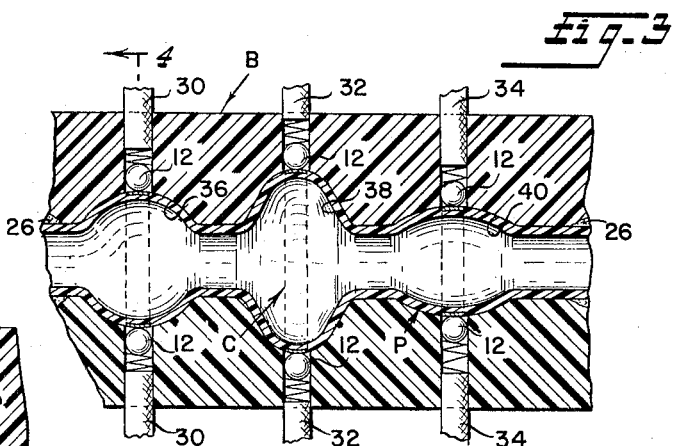
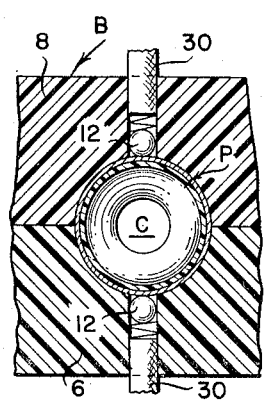
fig.4
INVENTOR
Bernard Edward Shlesinger Jr.

INVENTOR
Bernard Edward Shlesinger Jr.

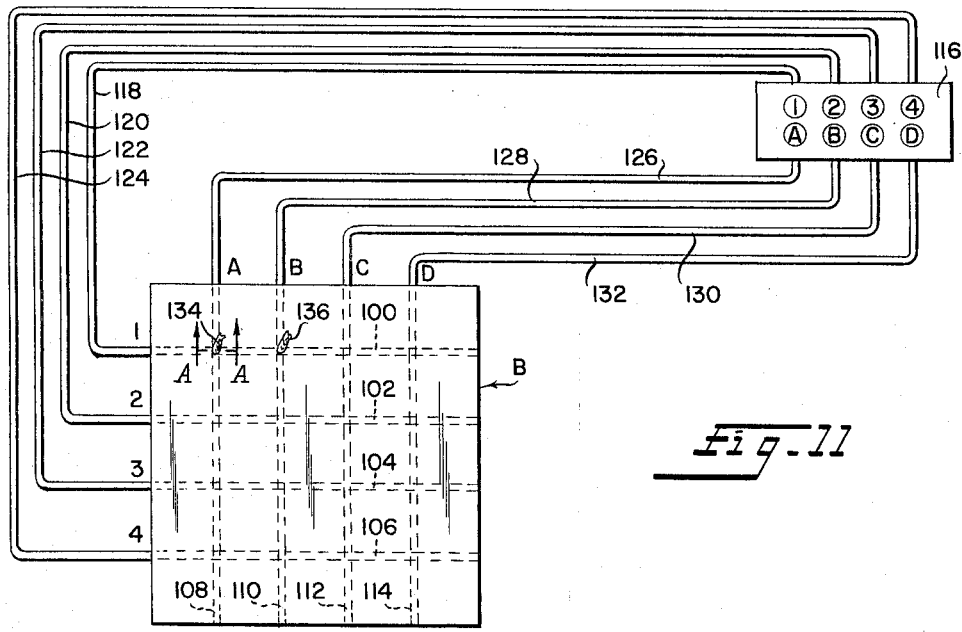
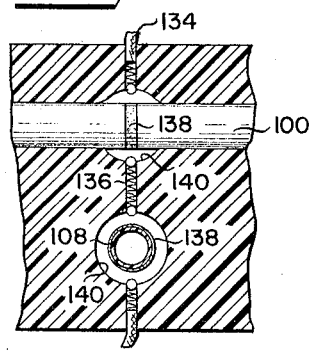
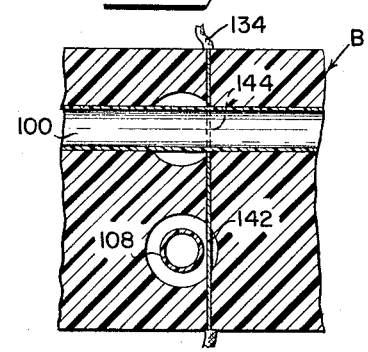
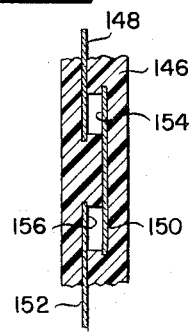
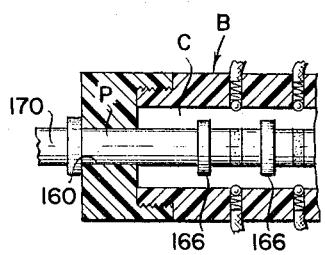
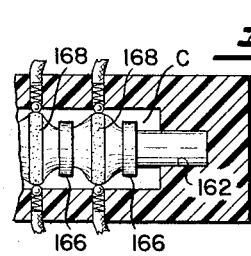

United States Patent Office 3,304,386
Patented Feb. 14, 1967

3,304,386
MULTIPLE CONTACT PROGRAM SYSTEM FLUID PRESSURE TYPE
Bernard Edward Shlesinger, Jr., 906 Bruce Lane, Annandale, Va. 22003
Filed June 25, 1964, Ser. No. 378,000
22 Claims. (Cl. 200—83)

This invention relates to improvements in multiple contact switches, programming systems and the like and particularly to improvements in fluid pressure type switches and systems. The present invention is in general related to switches as disclosed in my Patent 3,027,435 of March 27, 1962.

It is an object of this invention to provide a multiple contact system which allows for individual selection of various circuits.

It is an additional object of this invention to provide a multiple contact switch system which is simple in construction and inexpensive to manufacture.

It is a further object of this invention to incorporate the use of printed circuits or conductive areas in a multiple contact programming switch.

It is a further object of this invention to provide a fluid pressure type multiple contact system which is compact and readily assembled.

Still another object of this invention is to provide a multiple contact system which may be used for programming, computing, aircraft, rockets, telemetry, and telephony and the like.

It is another object of this invention to provide a multiple contact switch which may be kept relatively free from dust and moisture.

Still another object of this invention is to provide a programming system which may be operated from a remote source.

A further object of this invention is to provide a switch system which can be operated in an explosive atmosphere as all of the working parts will be enclosed.

Another object of this invention is to provide a switch system which can be fluid operated and in which the contacts are operated in an inert atmosphere so as to prevent ionization and short circuiting as for example in space operations.

Still another object of this invention is to provide a multiple contact programming system which can be utilized in the manner of a cross-bar switch system.

These and other objects of this invention will be apparent from the following description and claims. In the accompanying drawings which illustrate by way of example various embodiments of this invention;

FIGURE 1 is a side elevational view showing the fluid pressure conductor member being inserted into the circuit block.

FIGURE 2 is a fragmentary cross sectional view of the block shown in FIGURE 1.

FIGURE 3 is a cross sectional fragmentary view showing a modification of this invention.

FIGURE 4 is a fragmentary cross sectional view taken along the lines 4—4 of FIGURE 3 and viewed in the direction of the arrows.

FIGURE 11 shows a plan view of a cross-bar switching system utilizing this invention.

FIGURE 12 is an enlarged fragmentary view in cross section taken along the lines A—A of FIGURE 12.

FIGURE 13 is an enlarged fragmentary section of a different component which can be utilized in the system shown in FIGURE 11 taken along the lines A—A and viewed in the direction of the arrows.

FIGURE 14 is a fragmentary enlarged sectional view of a lead component of the type used in FIGURE 13.

FIGURE 14 is an enlarged fragmentary cross sectional view showing one type of pressure sensitive lead which may be used.

FIGURE 15 is a fragmentary cross sectional view of a further modification of this invention prior to the inflation of the plug in the chamber of the block.

FIGURE 16 is a cross sectional fragmentary view of the apparatus shown in FIGURE 15 with the sleeve of the plug expanded.

FIGURES 1 and 2

Figure 5:
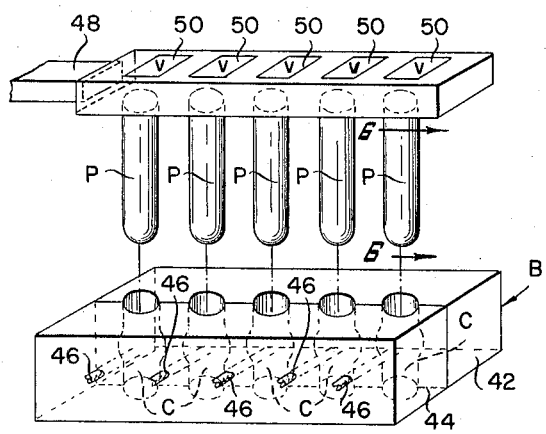
FIGURE 5 is a perspective view of another modification of the block showing the fluid pressure manifold and conductor members about to be lowered into the block.

In FIGURES 1 and 2, a block B is generally indicated which receives a plug P. The plug P is connected to a source of fluid supply such as air or liquid at the connection 2. In FIGURE 1, the plug is hollow and comprises a flexible plastic or rubber diaphragm or tubular member having as shown in FIGURE 1 a series of conductive areas 4 which may be printed circuits or the like.

The block B as illustrated in FIGURE 1 comprises two cooperating shell members 6 and 8 which form a central cavity, chamber or opening C. Projecting into the block B are a series of circuits 10 which in the case of FIGURE 1 extend at least inwardly of the block B until the contact points 12 are flush with the chamber wall C or project slightly into the chamber C. The contact members 12 are preferably biased by a spring member 14 or the like as best shown in FIGURE 2. A receiver 16 is positioned at the forward end of the chamber C for receiving the plug P. It is to be noted that the chamber C is provided with a series of recesses 18 in the area of the contacts 12. Between the recesses 18, are constrictions 20 in the chamber C. The constricted portions 20 are of slightly greater cross sectional dimension than the greatest cross sectional dimension of the plug P. At either end of the block B, the chamber C is constricted as at 22 and 24 for reasons hereinafter set out.

In FIGURE 2, the plug P is shown inserted into the chamber C. The plug P is mounted within the chamber C so that the conductive areas 4 are located directly under the conductive contacts 12. When the plug P is inserted into the chamber C, the portions of the plug P adjacent the constricted areas 22 and 24 may be adhesively secured by cement 26 or the like.

Operation of FIGURES 1 and 2

When the plug P is inserted into the chamber C, and fluid pressure is passed into the plug P, the plug P because of its resilient and expandable nature, will expand in the areas of the recesses 18 and the conductive coating or printed circuits 4 will come in contact with the recesses 18 thereby bridging the circuits 10. The constricted areas 20, 22 and 24 serve as support means for the flexible tube or fluid expandable plug P. This prevents sagging of the tube or plug P in the chamber C should the plug P have no support means such as hereinafter described.

The adhesive 26 is used to prevent the plug P from "drawing-up" in one end of the chamber C. It will be obvious that the recesses 18 need not be deep but may be shallow so long as no contact is made prior to expansion of the plug P.

Removability of the plug P may be dependent on certain factors hereinafter brought out.

FIGURES 3 and 4

FIGURE 3 differs from FIGURE 2 in that the circuits 30, 32, and 34, have their contacts 12 flush with or extending into recesses 36, 38 and 40. It is to be noted that recess 36 is not quite as deep as recess 38 and recess 40 not quite as deep as recess 36.

Operation of modification shown in FIGURES 3 and 4

When fluid pressure is allowed to expand the plug P in the chamber C of FIGURE 2, assuming that the elastic wall of the plug P is of uniform thickness, a time differential will be created between the closing of the various circuits 30, 32, and 34. It will take a greater pressure to expand the diaphragm or plug P into the recess 36 than it will into the recess 40. An even greater time will be required to expand the plug P into the recess 38. It will thus be obvious that circuit 34 will be activated before circuit 30 and circuit 30 will be operated before circuit 32.

Though FIGURES 1 through 4 disclose conductive contacts 12, and printed circuit areas 4, it will be obvious that microswitches or other type pressure switches may be utilized which will be activated when the wall of the plug P comes in contact with the pressure sensitive device extending into the block B. Pressure sensitive switches as such are well known in the art and can be readily installed in blocks for the purposes contemplated.

Modifications shown in FIGURE 5

In FIGURE 5, the block B which may be formed from two cooperating members 42 and 44, is formed with a series of chambers C. Circuits 46 extend or at least are flush with the walls of the chamber C as heretofore described. The chambers C are formed in the same manner as illustrated in FIGURES 1 and 2; i.e. with recesses. Cooperating with the block B are a series of plugs P which are connected to a manifold M. The manifold is in turn connected to a fluid supply source by means of a tubular or like connection 48. Associated with the manifold and plug assembly are a series of valves 50. Each plug has its own valve 50 which controls the flow of fluid from the manifold M into the plug P. It will be obvious that any type of valve mechanism may be used and associated with the manifold and that many types are available in the valve art for such purposes and this invention in no way involves the valve arrangement or type of valve which may be adapted in the manifold-plug assembly.

Operation of the FIGURE 5 modification

When fluid is brought into the manifold-plug assembly after the assembly has been inserted into the block B, the pressure will expand the plugs P in the chambers C in whatever programmed arrangement has been selected by proper adjustment of the valves 50. If for example the first, third and fifth plug valves 50 are closed down more than the second and fourth plug valves 50, more pressure will be required to expand the first three plugs than the last two. Therefore the speed of operation of the various circuits can be controlled by the rate of pressure increase in the manifold M. Any sequential order desired and time sequence will be dependent upon the rate of increase of the pressure in the manifold M as well as by control of the valves 50. It would be obvious that the block B may contain many more circuits than shown and more than one circuit for each chamber C.

Types of plugs as illustrated in FIGURES 6, 6A, 6B and 9

Figure 6A:
FIGURES 6A and 6B are fragmentary sectional views of the expandable conductor or contact member.
Figure 6B:
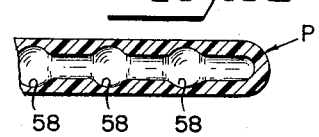
Figure 6:
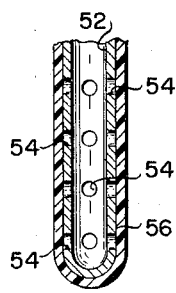
FIGURE 6 is a fragmentary cross sectional view of one of the conductor members including a mandrel.

In FIGURE 6, the plug P is shown supported by a mandrel 52 having a series of perforations 54 therein. The mandrel may be of some rigid material such as metal or high strength plastic or the like. Fluid is introduced into the mandrel and passes through the perforations 54 and expands the rubber-like diaphragm member 56 supported by the mandrel.

FIGURE 6A shows a plug P which has an increasing wall thickness from near the point of entry of the fluid to the end of the plug P. The outside diameter of the plug P will be uniform in order to permit the plug to be inserted into the chamber C. The internal diameter of the opening in the plug P will of course narrow down towards the end. The purpose for utilizing a plug P of this type is that the thinner portion of the wall will expand more rapidly than the thicker portion therefore the contacts as for example in the system shown in FIGURE 2 will be sequenced from left to right as fluid pressure continues to increase in the plug P.

In FIGURE 6B, the expandable plug P is formed with a series of recesses 58 which may be molded therein. In general, the walls of the membrane of the plug P in FIGURE 6B are of uniform thickness except at the recesses 58. When pressure is applied within the expandable plug P, the plug P will expand at the areas of the thin wall in the recesses 58. Variation in the depth of the recesses will of course allow for sequential operation of a series of contacts which may be engaged by the walls of the plug P in the areas of the recesses 58 when fluid pressure is applied within the plug P.

In the instances of FIGURES 6A and 6B, supporting mandrels may be used as deemed necessary. This is particularly important where the plugs are of the removable type and not of the adhered type as illustrated in FIGURES 2 and 3 where adhesive bonds the plug P to the chamber C. The support mandrel 52 as illustrated in FIGURE 6 prevents axial displacement inwardly toward the source of fluid pressure while the membrane or flexible diaphragm 56 of the plug expands laterally.

Figure 9:
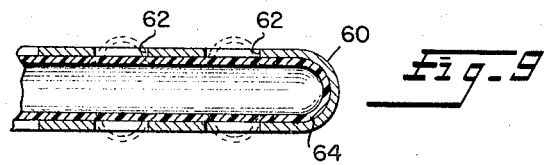
FIGURE 9 is a fragmentary cross sectional view of a further modifiction of the insertable member in which the mandrel support is outside of the inflatable sleeve.

In FIGURE 9, the plug P is comprised of a supporting mandrel 60 having a series of openings 62 therein. Within the mandrel 60 is a flexible tubular diaphragm or expandable member 64. When fluid pressure is applied, the expandable member 64 expands into and through the openings 62 as shown in the dotted lines. In this instance, contact is made with the circuits only in the areas where the openings 62 are formed in the mandrel or support member 60.

It is further obvious that any of the various plugs P illustrated may be used in conjunction with any of the blocks B as desired. It is further obvious that the expandable members on the mandrels of the plugs P may operate pressure sensitive switches or may have coated on the outer surface thereof or embedded therein contacts or contact surfaces for conducting between circuits as desired.

Figure 7:
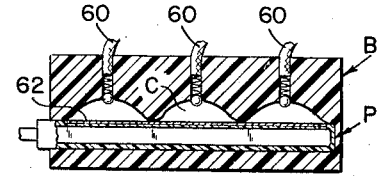
FIGURE 7 is a cross sectional view of a further modification of this invention illustrating contacts on the upper side of the block only.
Figure 8:
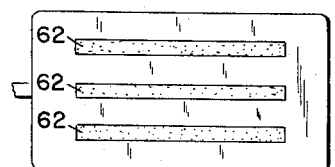
FIGURE 8 is a top plan view showing printed circuits on the inserted inflatable member utilized in FIGURE 7.

Modifications illustrated in FIGURES 7 and 8

In FIGURES 7 and 8, the block B is shown as having circuits 60 as entering from only one side thereof. The plug P in this instance is generally of flat configuration having thereon a series of printed circuits 62 which run longitudinally of the plug P. In this instance, the conductive areas 62 bridge between adjacent circuits 60 rather than on opposite sides of the chamber C as illustrated in FIGURE 2.

Figure 10:
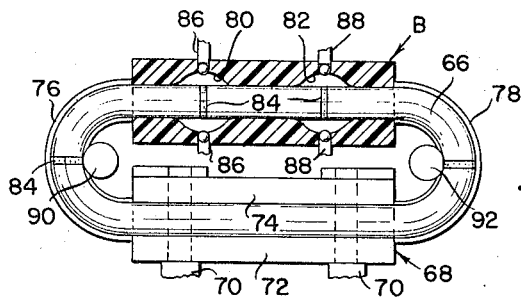
FIGURE 10 is a further modification of this invention showing a continuous inflatable sleeve and means for compressing the sleeve.

Modification as illustrated in FIGURE 10

In FIGURE 10, the block B supports a hollow tubular continuous flexible belt 66. A clamping block 68 is provided opposite to the block B. The clamping block is provided with rotary screw members 70 which may be connected to a source of power (not shown). When the screw members are rotated in compressive direction, block halves 72 and 74 come together to squeeze the tubular member 66 which is normally inflated. Restrictor housings 76 and 78 prevent the tubular member 66 from expanding when squeezed except in the areas of the recesses 80 and 82. Conductive areas 84 on the tubular belt 66 may be positioned in line with the circuits 86 and 88 as desired when drive roll 90 operating through restrictive housing 76 moves the tube 66 through the block B. An idler pulley 92 is provided on the other side of the assembly engaging the inflatable member 66 through the restrictor housing 78.

*Operation of the modification of FIGURE 10*

It will now be obvious that when the drive gear 90 is rotated, the belt number 66 will move through the block B and advance the conductive areas 84 as desired. In this arrangement, either circuit 86 or 88 can be alternately operated or simultaneously operated as desired. Increasing the number of circuits allows for greater selection and arrangement of the conductive areas on the belt 66. When the pressure or clamping block 68 comes down on the belt 66 which is already inflated under pressure, the belt will swell in the areas of the recesses 80 and 82 thereby engaging the conductive contacts of the circuits 86 and 88.

*Cross-bar switching system, FIGURES 11 through 14*

In FIGURE 11, the block B is provided with a series of horizontal inflatable conduits 100, 102, 104 and 106 and a series of vertical conduits 108, 110, 112 and 114. It is obvious that any of the previous inflatable plugs P can be used in the block B and that the block B will have recesses similar to those heretofore described. A panel 116 having a series of buttons numbered 1, 2, 3, 4 and A, B, C, and D is connected by means not shown to a pressure supply source. Conduits 118, 120, 122 and 124 connect the horizontal members 100, 102, 104 and 106 to the panel 116 and to plungers 1, 2, 3, and 4. Conduits 126, 128, 130 and 132 connect vertical inflatable members or plugs 108, 110, 112, 114 with panel 116 and plungers or operator buttons A, B, C and D.

As illustrated in FIGURES 12 and 13, the conduits of one series are spaced in a plane parallel to the conduits of the other series (i.e. plugs 1, 2, 3 and 4 are in a plane parallel and spaced from plugs A, B, C, and D). In the block B various circuits are arranged at the intersection of crossing conduits. Note for example in FIGURE 11 circuits 134 and 136.

For purposes of illustration, let us assume that in FIGURE 12, plug 100 is the horizontal member shown and plug 108 is the vertical member shown. Conductor bands such as 138 would be supplied at the various intersections as illustrated. The conductor bands would be located at the recesses 140 in the block B as illustrated in FIGURE 12. Circuit 134 would have a central member 136 bridging the recesses 140.

*Operation of the conductive type cross-bar system*

As will now be obvious from considering FIGURES 11 and 12, when plunger 1 is operated, fluid will travel through conduit 118 and inflate plug 100 bridging circuit 134 to its intermediate connector 136. The circuit will not be operative however until plunger A is depressed causing fluid to enter line 126 thereby inflating plug 108 bridging the lower part of the circuit 134 with the intermediate member 136 and establishing a circuit connection throughout the circuit 134. It will now be obvious that any individual circuit can be operated independent of any other individual circuit in the cross-bar arrangement since it will require the operation of two plungers at the intersection before circuit bridging will be made. It will be further obvious that any number of circuits can be arranged in the manner shown depending upon the number of conduits and plugs both horizontal and vertically. Though the arrangement shows only a two dimensional configuration, it is further contemplated that a three dimensional arrangement can easily be arranged utilizing X, Y, Z coordinates and a third group of plugs P and the various cooperating features similar to those described. By providing a relay system which will maintain a circuit open upon initial actuation of circuit 134, plungers 1 and A may be released to operate other circuits in the cross-bar block B. A second relay would operate to open the circuit again when initial operating and closing circuit 134 was operated again by pressure on plungers 1 and A.

*FIGURE 13 and FIGURE 14 modification*

The operation of the device shown in FIGURES 13 and 14 is substantially that shown in FIGURE 12. The only difference is that instead of a conductive system, a pressure sensitive system is provided for operating the cross-bar switch assuming that microswitches or the like might be utilized. In this instance, the circuit 134 is provided with pressure sensitive areas 142 and 144. FIGURE 14 shows one typical type of arrangement which can be provided for use with the pressure sensitive system. In this instance, the circuit 134 is provided with an insulated cable 146 in which is embedded a pair of conductors 148, 150 and 152. Conductor 150 is spaced from conductors 148 and in certain areas 154 and 156 is spaced by an air gap only. Thus when pressure is exerted on the insulation 146, it will tend to collapse in the areas of 154 and 156. These areas will be located so as to cooperate at points 142 and 144 of the circuit 134.

It will now be obvious that the structure shown in FIGURE 13 will operate in the manner of the structure shown in FIGURE 12 in that operation of one membrane or plug such as 100 will not operate the circuit unless the other plug or membrane such as 108 is simultaneously closed.

*Modifications shown in FIGURES 15 and 16*

In the modification shown in FIGURES 15 and 16, the block B includes a sealed chamber C. The plug P will be supported at either end of the block B at opening 160 and at recess 162. The opening 160 may be sealed around the plug P by any of the various sealing means such as adhesive, threading, or O-rings. The block B includes a cap portion 164 for access to the chamber C.

A series of constrictor rings 166 are provided on the plug P on either side of the conductive areas 168. When fluid is brought into the plug P through the connecting tubing 170, the flexible sleeve on the plug P will expand as noted in FIGURE 16 and the constricting rings 166 will permit expansion only in the areas desired. The constricting rings may be of varying widths depending upon requirements.

It will now be obvious that the block B may be constructed of any durable plastic material or non-conductive material as desired or conductive material in instances where the circuits are insulated from the conductive material. The block B as heretofore mentioned may have its chamber sealed and the chamber C may be of any dimensional size depending upon the number of plugs P and the shape of the plug.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention what I claim is:
1. A programming system including:
   (a) a switch block
   (b) a chamber in said switch block and an opening for said chamber
   (c) a plurality of spaced electrical contact members in said block extending radially about the longitudinal axis of said chamber and entering said chamber
   (d) an elongated inflatable member extending into said opening and into and through said chamber
   (e) individually spaced means in said chamber for permitting radial inflation of said inflatable member at spaced intervals on its longitudinal axis and for preventing radial inflation at other spaced intervals on its longitudinal axis
   (f) means for preventing axial shifting of those portions of said inflatable member at opposite ends of said chamber when said inflatable member is being inflated, and
   (g) said inflatable member including means for making contact between said spaced electrical contact members.
2. A programming system as in claim 1 and wherein:
   (a) said chamber includes a plurality of recesses, and
   (b) at least one of said electrical contacts is in each recess.
3. A programming system as in claim 2 and wherein:
   (a) at least one of said recesses varies in depth from another of said recesses.
4. A programming system as in claim 1 and wherein:
   (a) said inflatable member is a continuous tubular belt.
5. A programming system as in claim 4 and wherein:
   (a) said inflating means includes a restrictor, and
   (b) pinch means for pinching said belt to force fluid in the belt to expand in the area of least resistance, and
   (c) including means for driving said belt through said block.
6. A programming system as in claim 1 and wherein:
   (a) said means in said chamber for permitting and preventing inflation includes a mandrel, and
   (b) said inflatable member is supported on the inside of said mandrel, and
   (c) including means for driving said belt through said mandrel is of hollow configuration and includes a plurality of openings in the wall thereof through which portions of said inflatable member pass,
   (d) said portions of said inflatable member being those which contact said contact members when said inflatable member is inflated.
7. A programming system as in claim 1 and including:
   (a) a plurality of chambers in said block and an opening for each chamber,
   (b) an inflatable member extending into each of said openings and into and through its respective chamber, and
   (c) means for inflating each inflatable member.
8. A programming system as in claim 7 and including:
   (a) a manifold, and
   (b) said inflatable members each connected to said manifold.
9. A programming system as in claim 1 and wherein:
   (a) said means in said chamber for preventing radial inflations includes spaced constrictor rings.
10. A programming system as in claim 7 and wherein:
    (a) at least one chamber lies in a plane transverse to the plane of another chamber.
11. A programming system as in claim 7 and including:
    (a) a first series of chambers extending in one direction, and
    (b) a second series of chambers extending in a direction transverse to said first series of chambers.
12. A programming system as in claim 11 and wherein:
    (a) said first series of chambers are positioned in a plane above said second series of chambers; and
    (b) connector means between said first and second planar chambers.
13. A programming system as in claim 11 and wherein:
    (a) said connector means between said first and second chambers is conductive.
14. A programming system as in claim 11 and wherein:
    (a) said connector means between said first and second chambers is pressure sensitive.
15. A programming system as in claim 7 and wherein:
    (a) said system includes means for selectively inflating said chambers.
16. A programming system as in claim 11 and wherein:
    (a) said system includes means for selectively inflating said first and second series of chambers.
17. A programming system for cross bar switching including:
    (a) a switch block
    (b) a first series of coplanar parallel elongated chambers in said block having an inflatable member extending into and through each of said first series of chambers,
    (c) a second series of coplanar parallel elongated chambers in said block in a plane above said first series of chambers and running in a direction transverse to and crossing over said first series and having an inflatable member extending into and through each of said second series of chambers,
    (d) a plurality of pairs of spaced electrical contact members in said block extending radially about the longitudinal axis of said chambers and entering into said chambers at said cross over points and one contact member of each pair extending into one of said first series of chambers and the other contact member of each pair extending into one of said second series of chambers,
    (e) connector means at cross over points connecting said first series of chambers with said second series of chambers, and
    (f) said inflatable members including means for making contact between said spaced pairs of electrical contact members.
18. A programming system as in claim 17 and including:
    (a) means for selectively electrically connecting any of said first series of chambers to any of said second series of chambers without electrically connecting any other connectors in either series.
19. A programming system as in claim 18 and wherein:
    (a) said means for connecting said first series of chambers with said second series of chambers is conductive.
20. A programming system as in claim 18 and wherein:
    (a) said means for connecting said first series of chambers with said second series of chambers is pressure sensitive.
21. A programming system as in claim 1 and wherein:
    (a) said inflatable member includes an inflatable sleeve having a constant outside diameter when non-inflated and a tapering inside diameter when non-inflated.
22. A programming system as in claim 1 and wherein:
    (a) said inflatable member includes a sleeve having a generally constant outside diameter when non-inflated and an irregular inside diameter when non-inflated.

(References on following page)

References Cited by the Examiner

UNITED STATES PATENTS

| | | | |
|---|---|---|---|
| 2,254,673 | 9/1941 | Baret | 200—83 |
| 2,606,442 | 8/1952 | Raines | 200—83 |
| 2,813,180 | 11/1957 | Hantack | 200—168 X |
| 2,926,011 | 2/1960 | Slemmons et al. | 92—90 X |
| 2,953,654 | 9/1960 | Bauder | 200—46 |
| 3,027,435 | 3/1962 | Shlesinger | 200—83 |
| 3,091,676 | 5/1963 | Koster | 200—83 |
| 3,209,089 | 9/1965 | Weissburg | 200—83 X |

BERNARD A. GILHEANY, *Primary Examiner.*

H. M. FLECK, *Assistant Examiner.*